Oct. 7, 1969  B. W. McCLELLAN ETAL  3,471,227
DEVICE FOR CONTROLLING FILM PULL-DOWN MECHANISM TO
PROVIDE FORWARD, REVERSE AND STILL PROJECTION
IN A MOTION PICTURE PROJECTOR
Filed March 15, 1967  2 Sheets-Sheet 1

BION W. MC CLELLAN
KENNETH W. THOMSON
INVENTORS

BY Steve E. Thomson
Robert W. Hampton
ATTORNEYS

Oct. 7, 1969    B. W. McCLELLAN ETAL    3,471,227
DEVICE FOR CONTROLLING FILM PULL-DOWN MECHANISM TO
PROVIDE FORWARD, REVERSE AND STILL PROJECTION
IN A MOTION PICTURE PROJECTOR
Filed March 15, 1967                          2 Sheets-Sheet 2

BION W. MC CLELLAN
KENNETH W. THOMSON
INVENTORS

ATTORNEYS 3,471,227
DEVICE FOR CONTROLLING FILM PULL-DOWN
MECHANISM TO PROVIDE FORWARD, REVERSE
AND STILL PROJECTION IN A MOTION PICTURE
PROJECTOR
Bion W. McClellan and Kenneth W. Thomson, Rochester,
N.Y., assignors to Eastman Kodak Company, Rochester, N.Y., a corporation of New Jersey
Filed Mar. 15, 1967, Ser. No. 623,434
Int. Cl. G03b 21/38, 1/00
U.S. Cl. 352—169                               12 Claims

ABSTRACT OF THE DISCLOSURE

A motion picture projector has a movable film claw for advancing the film. A first cam is provided for driving the claw in an up-and-down direction. A second cam, concentric with the first cam, is provided for driving the claw in an in-and-out direction relative to the film perforations. A cam follower positioned between the second cam and the film claw may be moved to different positions about periphery of the second cam so as to change the relationship between the up-and-down motion and the in-and-out motion of the film claw to provide forward, reverse, and still projection of the film.

BACKGROUND OF THE INVENTION

Field of the invention

The invention relates generally to motion picture projectors, and more specifically to an improved device for controlling the film pull-down mechanism of a motion picture projector to provide forward, reverse and still projection.

Description of the prior art

Control devices for controlling the film pull-down mechanism of a motion picture projector to provide forward, reverse and single-frame or still projection are well known in the art. However, most film pull-down mechanisms known to applicants require a reversing of the drive shaft and motor, additional mechanism for holding out the film claw during still projection, and a relatively complicated control device for the mechanism. Applicants' invention is believed to overcome these and other disadvantages of the prior known mechanisms.

SUMMARY OF THE INVENTION

This invention includes within its scope a control device for the film pull-down mechanism of a motion picture projector in which the up-and-down and in-and-out motions of the film claw are controlled by cams mounted for rotation on a shaft and having corresponding cam followers cooperating therewith. The operation of the film pull-down mechanism to achieve forward, reverse and still projection is accomplished by varying the angular phase relationship of the cam followers, one of which is adjustable relative to the other.

One of the objects of the present invention is to provide an improved control device for the film pull-down mechanism of a motion picture projector for achieving forward, reverse and still projection in a rapid, facile manner.

Another object of the invention is to provide an improved control device for the film pull-down mechanism of a motion picture projector for achieving forward, reverse and still projection without the necessity of stopping and/or reversing the projector drive mechanism.

Another object of the invention is to provide an improved control device for the film pull-down mechanism of a motion picture projector in which the control device is of simple design and construction, thoroughly reliable and efficient in operation, and economical to manufacture.

BRIEF DESCRIPTION OF THE DRAWINGS

Objects and advantages other than those set forth above will be apparent from the following description when read in connection with the accompanying drawings, in which.

DESCRIPTION OF THE ILLUSTRATED EMBODIMENTS

Figure 1:
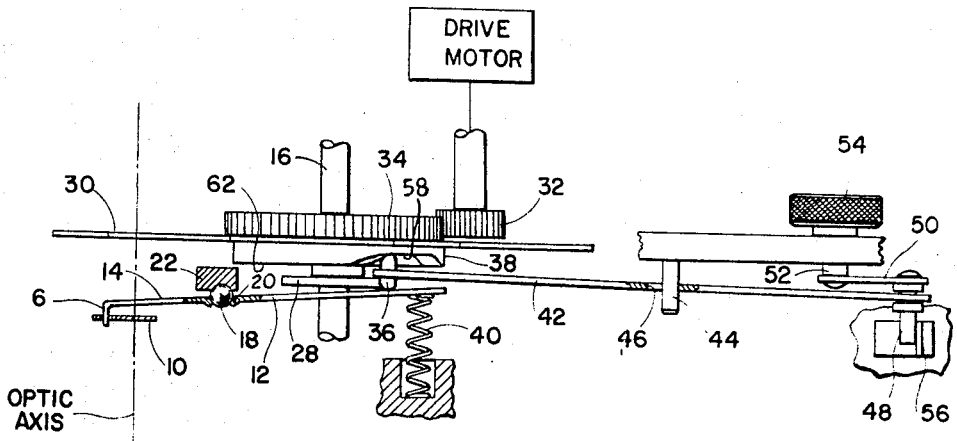
FIG. 1 is a top plan view of a portion of a motion picture projector showing the film pull-down mechanism and the preferred embodiment of the control device therefor, with portions omitted for purposes of clarity.

Referring to the drawings, this invention is shown in connection with a film pull-down mechanim for a motion picture projector. The film pull-down mechanism is of a known type having film claws 6 movable into and out of the perforations 8 of film 10 and up and down to move the film, alternatively, in forward and reverse directions. The pull-down mechanism comprises a film indexing shuttle 12 having a pair of spaced, parallel arms 14 extending from one end thereof, each provided with a pair of claws 6 for movement into and out of perforations 8 in film 10. The shuttle 12 has an elongated opening 15 for accommodating a drive shaft 16 and is mounted for vertically oriented, up-and-down movement on a pair of steel balls 18 interposed between recesses 20 in shuttle 12 and a guideway 22. The opposite end of shuttle 12 has a laterally extending cam follower 24 positioned below and up-and-down cam 28 and biased by a spring 26 into engagement with the periphery of cam 28, as best seen in FIG. 2. The cam 28, along with a shutter blade 30, is secured to drive shaft 16, which is unidirectionally driven by a drive motor (shown schematically in FIG. 1) through gears 32, 34. In addition to being vertically movable by virtue of cam 28 and cam follower 24, shuttle 12 is pivotally movable in a horizontal or lateral direction about steel balls 18 for moving claws 6 into and out of film perforations 8. This in-and-out movement of claws 6 is achieved by a cam follower 36 interposed between shuttle 12 and the face of an in-and-out cam 38 secured to shaft 16. Although cam 38 is axially spaced from cam 28, there is no reason why the two cannot be combined into a single cam. For example, the periphery of cam 38 could be constructed with a configuration similar to the periphery of cam 28. A spring 40 urges shuttle 12 in the counterclockwise direction, as viewed in FIG. 1, for urging cam follower 36 into engagement with the face of in-and-out cam 38. In this film pull-down mechanism, unidirectional rotation of shaft 16 imparts up-and-down and in-and-out motions to film claws 6 in a correctly timed relationship to provide, alternatively, forward, reverse and still projection.

THE PREFERRED EMBODIMENT

Figure 2:
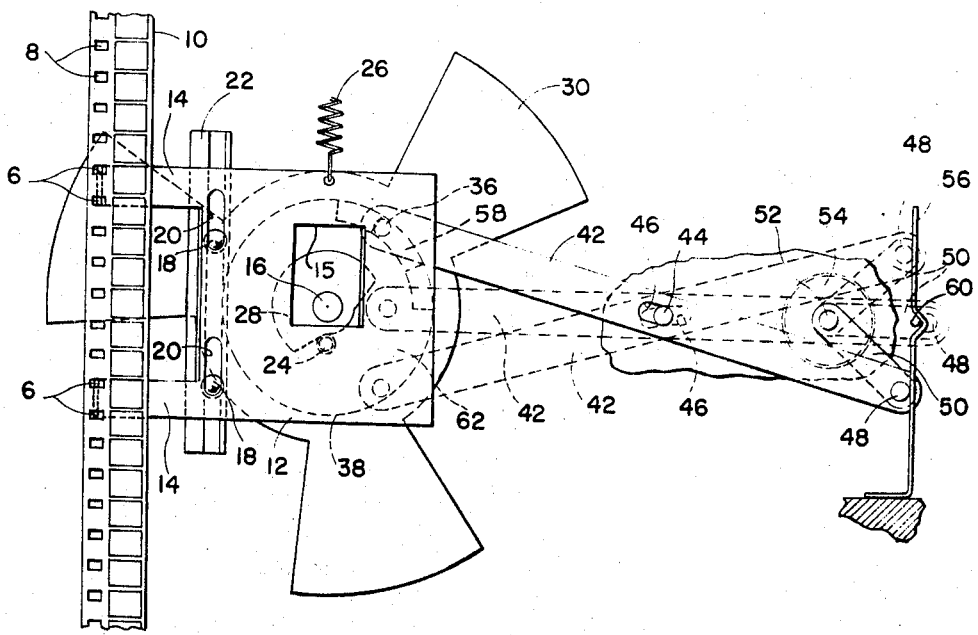
FIG. 2 is a front elevational view of the structure of FIG. 1.

The control device for the film pul-down mechanism to achieve, alternatively, forward, reverse and still projection comprises, in the preferred embodiment illustrated in FIGS. 1 and 2, a lever 42 pivoted about an axle 44 extending through an elongated slot 46 in lever 42. Cam follower 36 is secured to one end of lever 42 and is interposed between shuttle 12 and in-and-out cam 38. The opposite end of lever 42 is pivotally connected to a spindle 48 at one end of an arm 50, the opposite end of which is secured to a rotatable shaft 52. The shaft 52 has a knob 54 mounted thereon for rotating shaft 52 between forward, reverse and still positions. The lever 42 is held in its forward and reverse positions by a spring 56 that is biased against spindle 48 for urging one end of slot 46 into engagement with pivot 44. In these two positions, cam follower 36 is in engagement with a partially annular recessed surface 58 near the periphery of face cam 38. An indentation 60 in spring 56 cooperates with spindle 48 for releasably holding lever 42 in the "still" position. In this position, cam follower 36 is in engagement with an unrecessed flat surface 62 of face cam 38 which is not radially spaced as far from the center of shaft 16 as is came surface 58. Cam surface 62 cooperates with cam follower 36 to retain film claws 6 out of engagement with film 10 for the full 360° of rotation of drive shaft 16 and cams 28, 38.

AN ALTERNATIVE EMBODIMENT

Figure 3:
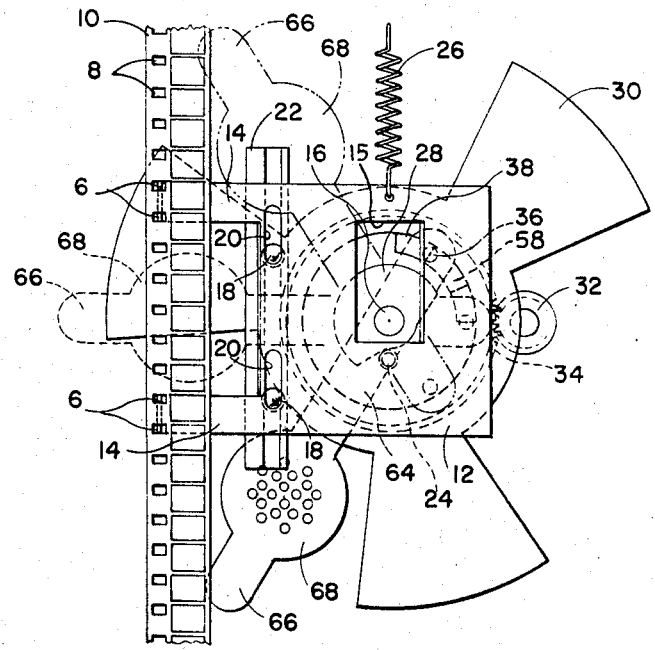
FIG. 3 is a view similar to FIG. 2 showing an alternative embodiment of the control device.

In the alternative embodiment of the control device for the film pull-down mechanism illustrated in FIG. 3, parts identical to those already described with reference to the preferred embodiment illustrated in FIGS. 1 and 2 are denoted by the same reference numerals. In this embodiment, a lever 64 is pivotable about shaft 16, and has cam follower 36 secured to one end thereof. The cam follower 36 follows cam surface 58 along a fixed radius on in-and-out cam 38. The opposite end of lever 64 has a handle 66 for movement of lever 64 between "forward," "reverse" and "still" positions. Radially inward from handle 66, lever 64 is provided with a suitable filter or perforated plate 68, which, in the "still" position of lever 64, is in register with the optic axis of the projector, and is interposed between the projection lamp, not shown, and film 10 for protecting the film. Since cam follower 36 is secured to one end of lever 64, movement of lever 64 between its three positions varies the angular position of cam follower 36 relative to cam 38 and cam follower 24. The positions are angularly spaced a distance of 60° so that the angular movement of cam follower 36 relative position to its cam surface 58 when lever 64 is moved from the "forward" position to the "reverse" position is a total of 120°.

Figure 4:
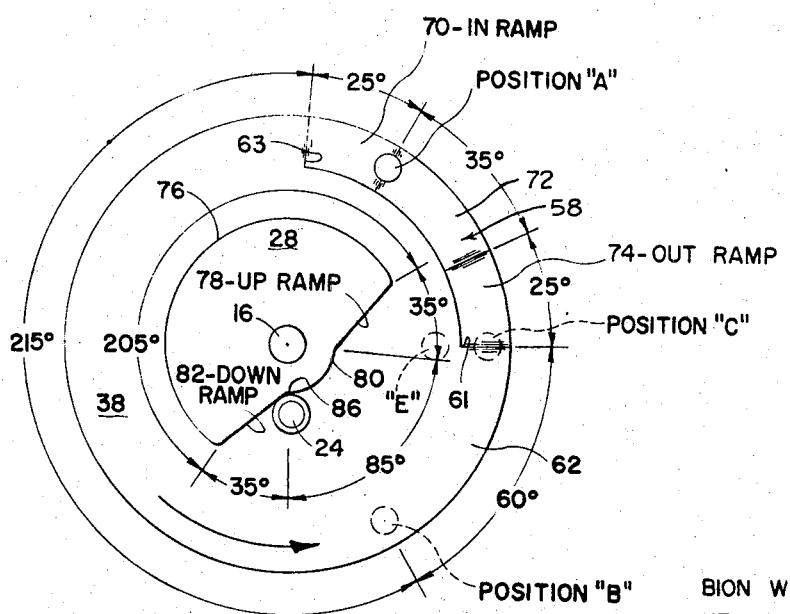
FIG. 4 is a diagrammatic view in elevation showing the cams and cam followers for producing up-and-down and in-and-out movement of the film claw, and further showing the angular phase relationship therebetween.

The configuration and phase relationship of the up-and-down and in-and-out cams 28, 38 for both embodiments are best seen in FIG. 4.

The up-and-down cam 28 (see FIG. 4) has a peripheral cam surface 76 at a fixed radial distance from the center of shaft 16 extending through an angle of substantially 205°, over which surface the travel of cam follower 24, upon movement of cam 28 in the direction of the arrow, holds shuttle 12 and film claws 6 in their lowermost position. Cam 28 has a peripheral "up" ramp 78 at one end of surface 76 extending through an agle of substantially 35°, over which ramp cam follower 24 moves radially inwardly upon movement of cam 28 in the direction of the arrow, permitting movement of shuttle 12 and film claws 6 to their uppermost position. The cam 28 has a peripheral dwell surface 80, at a lesser radial distance from the center of shaft 16 than the radial distance of surface 76, that is connected to ramp 78 and extends through an angle of substantially 85°, over which surface 80 the travel of came follower 24 continues to hold shuttle 12 and film claws 6 in their uppermost position. The cam 28 has a peripheral "down" ramp 82 connecting dwell surface 80 to surface 76 and extending through an angle of substantially 35°, over which ramp the cam follower 24 moves radially outwardly upon continued movement of cam 28 to return shuttle 12 and film claws 6 to their lowermost position.

The in-and-out cam 38 has its unrecessed flat surface 62 at a fixed axial distance from the opposite side thereof, as seen in FIG. 1 has surface 62 extending through an angle of substantially 275°, as seen in FIG. 4. The cam follower 36, as it travels over the 275° of surface 62 in a clockwise direction from one end 61 the opposite end 63, keeps claws 6 out of engagement with film 10. Continuing around cam 38 in the clockwise direction past end 63 of surface 62, recessed cam surface 58 has an "in" ramp 70 connected to end 63 and extending through an angle of substantially 25° through which angle the aforementioned fixed axial distance is decreased to a different value corresponding to the bottom of recessed cam surface 58. Travel of cam follower 36 down ramp 70 pivotally moves shuttle 12 and thereby urges claws 6 into perforations 8 in film 10. Recessed cam surface 58 has a flat dwell portion 72 connected to ramp 70 and extending through an angle of substantially 35°, over which portion the travel of cam follower 36 causes claws 6 to continue to extend into perforations 8 in film 10. The cam surface 58 has an "out" ramp 74 connecting the dwell portion 72 to the aforementioned end 61 of flat surface 62 and extending through an angle of substantially 25°, up which ramp the travel of cam follower 36 causes claws 6 to be moved out of engagement with film 10. The angular phase relationship of the two cams 28, 38, as seen in FIG. 4, is such that trailing end 61 of "out" ramp 74 is angularly spaced 90° from the leading end 86 of "down" ramp 82.

If the cam follower 24 is mounted above the cam 28 (180° out of phase from its present location), the cam configuration must be reversed, with the 85° surface being at a greater radial distance from the center of shaft 16 than the 205° surface. Also, the cam follower 24 would move radially outwardly on the "up" ramp 78 and radially inwardly on the "down" ramp 82.

The operation of cams 28, 38 and cam followers 24, 36, respectively, with reference to FIG. 4, covering a single revolution of shaft 16 when the illustrated embodiments of the control device of this invention are in their "forward" positions, will now be described. In the "forward" position of either embodiment, the cam follower 36 is positioned at the trailing end of the "in" ramp 70 of the in-and-out cam 38 at position A, as seen in full lines, and cam follower 24 is in its normal position at the leading end 86 of the "down" ramp 82 of the up-and-down cam 28. As shaft 16 and cams 28, 38 are rotated in a counterclockwise direction (see arrow) through an angle of 35°, the film claws 6, which extend through perforations 8 of film 10, are moved downwardly to advance the film in the forward direction. As film claws 6 reach their lowermost position, cam follower 36 is at the leading end of "out" ramp 74. During the next 25° of rotation of cams 28, 38, film claws 6 are moved out of engagement with film 10 while remaining in the lowermost position. This position of film claws 6 is maintained for the next 180° of rotation. Upon the next 35° of rotation, film claws 6 are moved to their uppermost position while held out of engagement with film 10. The film claws 6 are retained in this uppermost position for the remaining 85° of rotation to complete a single revolution of shaft 16 and cams 28, 38. During the last 25° of rotation, film claws 6 are moved into engagement with film perforations 8 in preparation for the next revolution of shaft 16 and cams 28, 38.

Now let us describe the operation of cams 28, 38 and cam followers 24, 36, respectively, with reference to FIG. 4, covering a single revolution of shaft 16 when the illustrated embodiments of the control device of this invention are in their "reverse" positions, in which cam follower 36 is at position B, angularly spaced 120° from position A. In this position, cam follower 36 is on dwell surface 62 of the in-and-out cam 38, in the dotted position shown in FIG. 4 for holding film claws 6 out of perforations 8 in film 10. The film claws 6 are also positioned in their uppermost position by virtue of cam follower 24 being in its normal position. Upon rotation of cams 28, 38 through an angle of 35°, film claws 6 are moved downwardly while being retained out of engagement with film 10. This position of film claws 6 continues for the next 180° of rotation. During the next 25° of rotation, cam follower 36 travels down "in" ramp 70, moving film claws 6 into engagement with perforations 8 of film 10. During this latter movement, film claws 6 are still at the lowermost position of their travel. During the next 35° of rotation, cam follower 24 moves over "up" ramp 78, causing film claws 6 to move upwardly to their uppermost position, moving film 10 in the reverse direction. During the next 25° of rotation, film claws 6 are moved out of perforations 8 in film 10 at the uppermost position of film claws 6. The film claws 6 are retained in this position for the remaining 60° of rotation to complete the revolution.

Again with reference to FIG. 4, the operation of the film pull-down mechanism will be described through a single revolution of drive shaft 16 with the alternative embodiment of the control device illustrated in FIG. 3 in the "still" position, in which cam follower 36 is at position C, angularly spaced 60° from positions A and B. In position C, cam follower 36 is positioned at the trailing end 61 of "out" ramp 74, and cam follower 24 again is in its normal position as seen in FIG. 4. Initially, film claws 6 will be positioned in their uppermost position and out of engagement with film 10. During the first 35° of rotation of cams 28, 38, film claws 6 are moved down to their lowermost position while retained out of engagement with film 10. During the next 205° of rotation, the film claws are retained out of engagement with film 10 while film claws 6 are retained in their lowermost position. During the next 35° of rotation, cam follower 24 travels over "up" ramp 78, causing film claws 6 to be moved upwardly to their uppermost position while retained out of engagement with film 10. For the next 25° of rotation, cam follower 36 travels down "in" ramp 70, causing film claws 6 to be moved into perforations 8 of film 10 while the film claws are retained at their uppermost position. For the next 35° of rotation, film claws 6 remain in their uppermost position in engagement with film 10. During the last 25° of rotation, cam follower 36 moves up "out" ramp 74, causing film claws 6 to be moved out of engagement with film 10 in this uppermost position. Accordingly, in their "still" position, up-and-down movement of film claws 6 is achieved while the film claws are out of engagement with film 10 so that no movement of the film takes place.

With reference to FIG. 4, when the preferred embodiment of the control device illustrated in FIGS. 1 and 2 is in the "still" position, cam follower 36 is positioned on flat surface 62 as seen dotted at E. Consequently, during the entire revolution of shaft 16 and cams 28, 38, claws 6 are held out of engagement with film 10.

The invention has been described in detail with particular reference to two embodiments thereof, but it will be understood that variations and modifications can be effected within the spirit and scope of the invention.

We claim:
1. A film pull-down mechanism for moving perforated film in a motion picture projector of the type providing more than one mode of projection, such as forward, reverse, and still projection, said mechanism comprising:
  (a) a movable film claw;
  (b) first cam means, including a first cam and a first cam follower, for moving said film claw up and down with predetermined limits,
  (c) second cam means, including a second cam concentric with said first cam and a second cam follower, for moving said film claw into and out of perforations in the film, second cam follower having a variable phase relationship with said first cam follower;
  (d) unidirectional drive means for unidirectionally driving said first and second cams; and
  (e) control means for varying the phase relationship of said second cam follower with said first cam follower, said control means being movable from a first position, in which said film claw is moved in response to one phase relationship of said first and second cam followers to provide film pull-down movement suitable for one mode of motion picture projection, to a second position, in which said film claw is moved in response to a different phase relationship of said first and second cam followers to provide film pull-down movement suitable for a different mode of motion picture projection.

2. The film pull-down mechanism claimed in claim 1 wherein said first and second cams are mounted adjacent to each other on a shaft for rotation therewith.

3. The film pull-down mechanism claimed in claim 1 wherein said first cam follower rides on the periphery of said first cam, and said second cam follower rides on the face of said second cam.

4. The film pull-down mechanism claimed in claim 1 wherein said first and second cams are integral portions of a unitary member fixed to a shaft for rotation therewith.

5. The film pull-down mechanism claimed in claim 1 wherein said control means includes a movable member coupled to said second cam follower for moving said second cam follower relative to said second cam from a first location, corresponding to said first position of said control means, to a second location, corresponding to said second position of said control means, whereby the phase relationship of said second cam follower with said first cam follower is varied from said one phase relationship to said different phase relationship upon movement of said movable member effecting movement of said second cam follower from said first location to said second location.

6. The invention according to claim 1 wherein said control means includes a movable member supporting said second cam follower, said movable member having a handle by which said movable member and said second cam follower may be manually moved from said first position to said second position.

7. The invention according to claim 1 wherein said control means includes a pivotable lever supporting said second cam follower, said lever having a handle by which said lever and said second cam follower may be manually moved from said first position to said second position.

8. The invention according to claim 1 wherein said first and second cams are mounted on a shaaft for rotation therewith; wherein said second cam has first and second cam surfaces; and wherein said control means includes a movable member supporting said second cam follower, said movable member being movable from said first position, in which said second cam follower rides on said first cam surface for moving said film claw into and out of the perforations in the film, to said second position, in which said second cam follower rides on said second cam surface for continuously holding said film claw out of the perforations in the film.

9. The invention according to claim 8 wherein said first and second cam surfaces are radially spaced.

10. In a control device for a film pull-down mechanism of a motion picture projector providing more than one type of projction, such as forward, reverse, and still projection, and having an optic path along which perforated film is projected, the film pull-down mechanism having a film claw; first cam means including a first cam follower for moving the film claw up and down within predetermined limits; second cam means including a second cam follower for moving the film claw into and out of perforations in the film; said first and second cams having a predetermined phase relationship therebetween; and unidirectional drive means for unidirectionally driving said first and second cams; the improvement comprising:

control means for altering the phase relationship between the first and second cam followers, said control means being movable from a first position, in which the film claw is moved in response to one phase relationship of the first and second cam followers to provide film pull-down movement suitable for one type of motion picture projection, to a second position, in which the film claw is moved in response to a different phase relationship of the first and second cam followers to provide film pull-down movement suitable for a different type of motion picture projection, said control means including a movable member supporting the second cam follower, said movable member having a filter element movable into the optic path when said movable member and the second cam follower are moved to one of said first and second positions.

11. In a control device for a film pull-down mechanism of a motion picture projector providing more than one type of projection of a perforated film, such as forward, reverse, and still projection, the film pull-down mechanism having a film claw; first cam means including a first cam and a first cam follower for moving the film claw up and down within predetermined limits; second cam means including a second cam and a second cam follower for moving the film claw into and out of perforations in the film; said first and second cams having a predetermined phase relationship therebetween; and unidirectional drive means for unidirectionally driving said first and second cams; the improvement comprising:

a shaft on which said first and second cams are mounted for rotation therewith; and control means for altering the phase relationship between the first and second cam followers, said control means being movable from a first position, in which the film claw is moved in response to one phase relationship of the first and second cam followers to provide film pull-down movement suitable for one type of motion picture projection, to a second position, in which the film claw is moved in response to a different phase relationship of the first and second cam followers to provide film pull-down movement suitable for a different type of motion picture projection, said control means including a lever pivotable about said shaft and supporting the second cam follower, said lever having a handle by which said lever and the second cam follower may be manually moved from said first position to said second position.

12. The invention according to claim 11 wherein the second cam has an annular cam surface radially spaced from said shaft, and the seocnd cam follower is movable along said annular cam surface.

References Cited

UNITED STATES PATENTS

| | | | |
|---|---|---|---|
| 3,261,654 | 7/1966 | Faber et al. | 352—173 X |
| 3,402,007 | 9/1968 | Gerlach | 352—169 X |

NORTON ANSHER, Primary Examiner

M. H. HAYES, Assistant Examiner

U.S. Cl. X.R.

352—173